Figure 4:
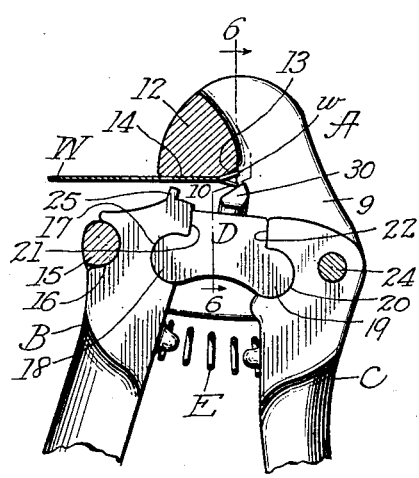

J. REIF.
SAW SET.
APPLICATION FILED JUNE 1, 1920.
1,403,634.
Patented Jan. 17, 1922.
2 SHEETS—SHEET 1.
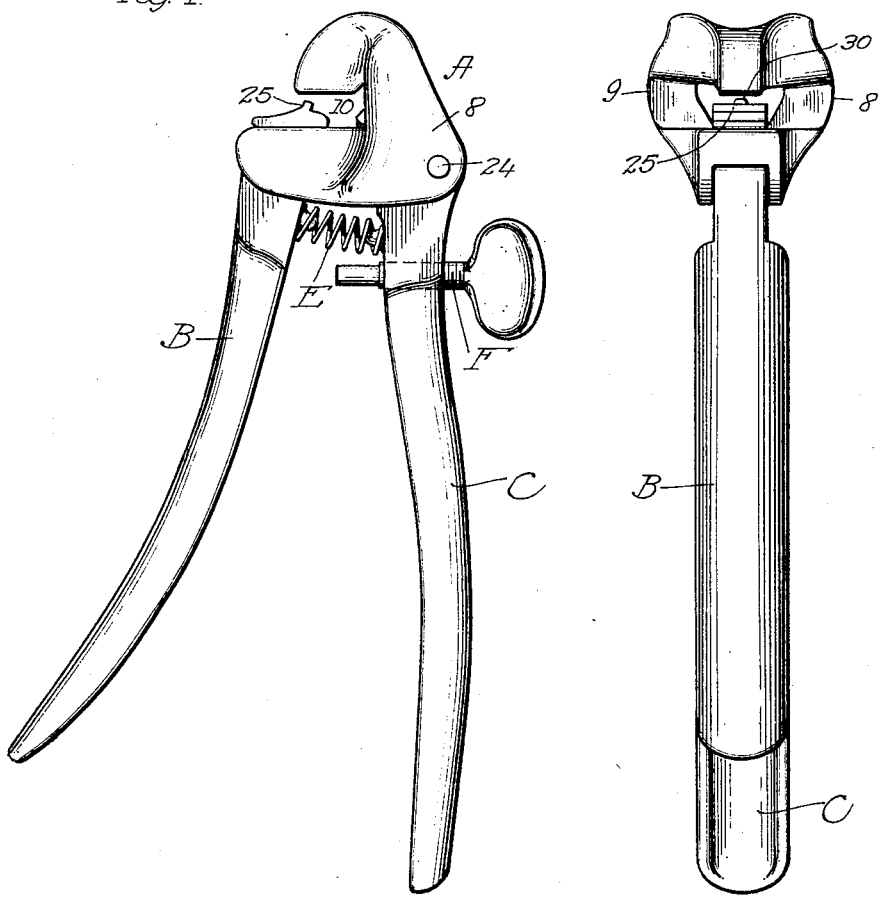
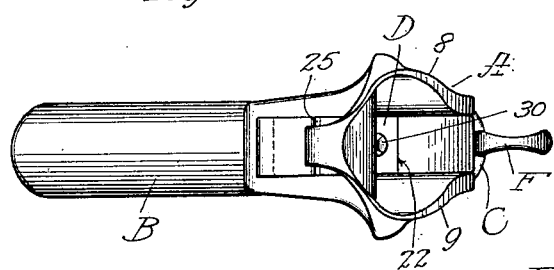

J. REIF.
SAW SET.
APPLICATION FILED JUNE 1, 1920.

1,403,634.

Patented Jan. 17, 1922.
2 SHEETS—SHEET 2.

Inventor
Joseph Reif
By Fisher Fowle Clapp & Soans
Attys.

UNITED STATES PATENT OFFICE.

JOSEPH REIF, OF HEBRON, INDIANA, ASSIGNOR OF FORTY-FIVE PER CENT TO FRANCIS E. LING, OF HEBRON, INDIANA.

SAW SET.

1,403,634.   Specification of Letters Patent.   Patented Jan. 17, 1922.

Application filed June 1, 1920. Serial No. 385,484.

*To all whom it may concern:*

Be it known that I, JOSEPH REIF, a citizen of the United States, residing at Hebron, county of Porter, and State of Indiana, have invented certain new and useful Improvements in Saw Sets, of which I do declare the following to be a full, clear, and exact description, reference being had to the accompanying drawings, forming a part of this specification.

The present invention has for its object to provide an improved appliance whereby the teeth of saws can be "set" so as to give to the saw the proper cutting action. My invention consists in the features of novelty hereinafter described, illustrated in the accompanying drawings and particularly pointed out in the claims at the end of the specification.

My invention contemplates more particularly the provision of a simple and effective hand tool for setting the teeth of saws, although it will be understood that the invention can be embodied in other forms than that shown in the drawings and the details of construction can be varied without departure from the scope of the invention.

Figure 5:
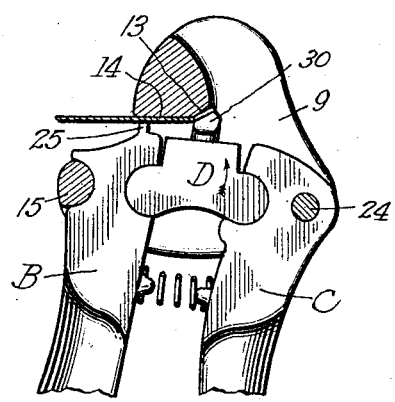
Figure 6:
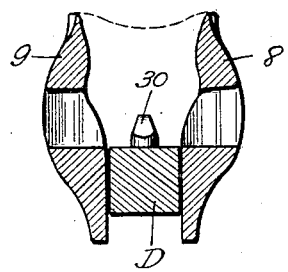
Figure 7:
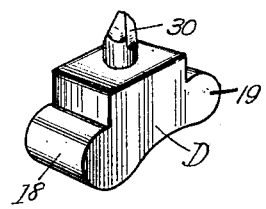

Figure 1 is a view in side elevation of a saw set embodying my invention. Figure 2 is a bottom plan view. Figure 3 is an end view. Figure 4 is a view in longitudinal section through the head of the saw set, parts being shown in side elevation and parts being broken away. Figure 5 is a view similar to Fig. 4 but showing the parts in a different position. Figure 6 is a sectional view on the line 6—6 of Fig. 4. Figure 7 is a detail perspective view of the tooth bending member of the saw set.

In the preferred embodiment of my invention, the appliance comprises four principal parts formed of suitable metal, preferably steel, viz., the head A, a pair of levers B and C and a tooth bending member D.

The head A is preferably chambered as shown; that is to say, its side walls 8 and 9 are spaced apart to receive the pivotal ends of the levers B and C and the member D. The head A is formed with a passageway 10 into which the saw blade W will be inserted when the teeth $w$ are to be set. Between the side walls 8 and 9 of the head A extends the heavy transverse member 12 that has an inclined surface 13 forming what may be termed the "anvil" against which the saw teeth will be bent and having also a plane surface 14 that will cooperate in the gripping of the saw blade so as to securely hold it while its teeth are being set. As shown, also, the side walls 8 and 9 of the head A are connected together by a transverse bar 15 on which the lever B will be pivoted, the bar 15 setting within a socket 16 formed near the end of the lever B. The opposite side of the lever B is formed with a socket 17 wherein will be pivotally seated one of the rounded knuckles 18 of the member D. This member D is formed at its opposite end with a similar rounded part or knuckle 19 that seats within a socket 20 formed adjacent the end of the lever C. The member D is formed with the shoulders 21 and 22 against which the opposing end portions of the levers B and C will bear respectively when the levers are in the position shown in Fig. 4, this being their position when the saw set is opened to receive a saw, and the levers are normally held in this open position by means of the coil spring E arranged between the levers as shown. The lever C is pivoted to the head A by the transverse pin 24 that passes through the lever C and through the side walls 8 and 9 of the head A.

The end of one of the levers B is formed or provided with a projection or gripping member 25. It is adapted to clamp or grip the saw blade W against the face 14 of the head A when the saw has been placed within the passageway 10 of the head. The member D is formed or provided with a seating pin or projection 30 having its end beveled as shown, the purpose of this pin projection 30 being to bend the teeth $w$ of the saw blade W against the beveled portion or anvil 13 of the head A. The pin or bar 30, the parts 13 and 14 of the head A, and the part 25 of the lever B should be rendered extremely hard so as to resist the wearing action incident to use.

As shown, the lever C is formed with a threaded opening through which passes the screw F that may be adjusted to limit the closing movement of the levers B and C and thus limit the extent to which the teeth $w$ of the saw W will be bent or set.

When the saw blade W is to have its teeth set by my improved appliance, the blade will be placed within the passageway 10, as indicated in Fig. 4 of the drawings. The operator will then with his hand draw the lever B towards the lever C and the first effect of this movement of the lever B will be to cause the projection 25 to clamp or grip the saw blade W against the face 14 of the head A. This initial gripping occurs because the knuckle 18 of the member D is closer to the dead center of rotation of the lever B than is the knuckle 19 with respect to the dead center of rotation of the lever C. As the operator continues to draw the levers B and C towards each other, the lever C will turn about the pivot pin 24 and will rock the member D in the direction of the arrow Fig. 5, giving to this member a swinging or rolling movement which will cause the teeth of the saw being set to be gradually bent over against the inclined or anvil portion 13 of the head A. I regard this operation of the tooth bending member D as highly advantageous because it gradually distributes the bending moment upon the saw teeth and avoids the danger of breaking the tooth, which is apt to occur in saw sets in which a plunger or like device acts directly or at right angles to the tooth in bending or setting the same. I also regard it as highly advantageous that the gripping of the saw blade W between the end of the lever B and the transverse portion 12 of the head A shall occur slightly in advance of the setting of the teeth, as in this way any slipping of the blade is effectively guarded against.

By the employment of the member D between the levers B and C, a compound leverage is secured which gives greatly increased power to my device and enables the operator to set the teeth of the saw with much less exertion than is required with other devices with which I am familiar. By forming the head A with its sides spaced apart, the operator holding the device in his hand is enabled to readily inspect the teeth as they are set.

Having thus described my invention, what I claim as new and desire to secure by Letters Patent is:—

1. A saw set comprising a head adapted to receive a saw, a pair of levers pivoted to said head, and a tooth bending member interposed between said levers and operable by the joint action thereof.

2. A saw set comprising a head adapted to receive a saw and provided with a portion to act as an anvil, a pair of levers pivoted to said head, and a single tooth bending member arranged between said levers and operable by the joint action thereof, said member being provided with a projection arranged opposite the anvil of the head and adapted to cooperate therewith in bending the saw teeth.

3. A saw set comprising a head, a pair of levers pivoted to said head, one of said levers having a part arranged to grip the saw against said head, and a member arranged between said levers and operable by the joint action thereof, said member being provided with a projection adapted to cooperate with a portion of the head in bending the saw teeth.

4. A saw set comprising a head, a pair of levers pivoted to said head, said levers being formed with opposing sockets adjacent their pivotal points, and a member having knuckles fitting within said sockets, said member being provided with a projection adapted to cooperate with a portion of said head in bending the saw teeth.

5. A saw set screw comprising a head having a part against which the saw blade will be gripped and having an anvil against which the saw teeth will be bent, a pair of levers pivoted to said head, said levers being formed with opposing sockets arranged at different distances from the opposing portion of said head, and a member having knuckles fitting within said sockets, said member being provided with a projection adapted to bend the saw teeth, the lever that is formed with the socket nearest the gripping face of said head being provided with a part to clamp or grip the saw.

6. A saw set comprising a head formed with a transverse passage to receive the saw blade and provided at one side of said passage with a part against which the saw blade may be clamped and with a part against which the saw teeth may be bent, the side walls of said head being spaced apart to permit the inspection of the saw teeth as they are bent, a pair of levers pivoted to said head, one of said levers being provided with means for clamping the saw blade against the head, and a member pivotally arranged between said levers, said member being provided with a projection adapted to bend the saw teeth against the anvil of the head.

7. A saw set comprising a head having its side walls spaced apart and having a transverse pivot bar integrally connected to said side walls, said head being provided with an anvil against which the saw teeth may be bent, a pair of levers one of which is pivotally mounted upon said transverse bar, a pivot pin extending between the side walls of said head and whereon the other of said levers is pivotally mounted, a member pivotally arranged between said levers, said member being provided with a projection adapted to bend the saw teeth.

8. A saw set comprising a head, a pair of levers pivoted to said head, a tooth bending member pivotally arranged between said levers, and an adjusting screw arranged for limiting the closing movement of said levers.

JOSEPH REIF.